O. CARLBORG.
COMBINATION LATHE TOOL.
APPLICATION FILED FEB. 11, 1908.
940,301.
Patented Nov. 16, 1909.
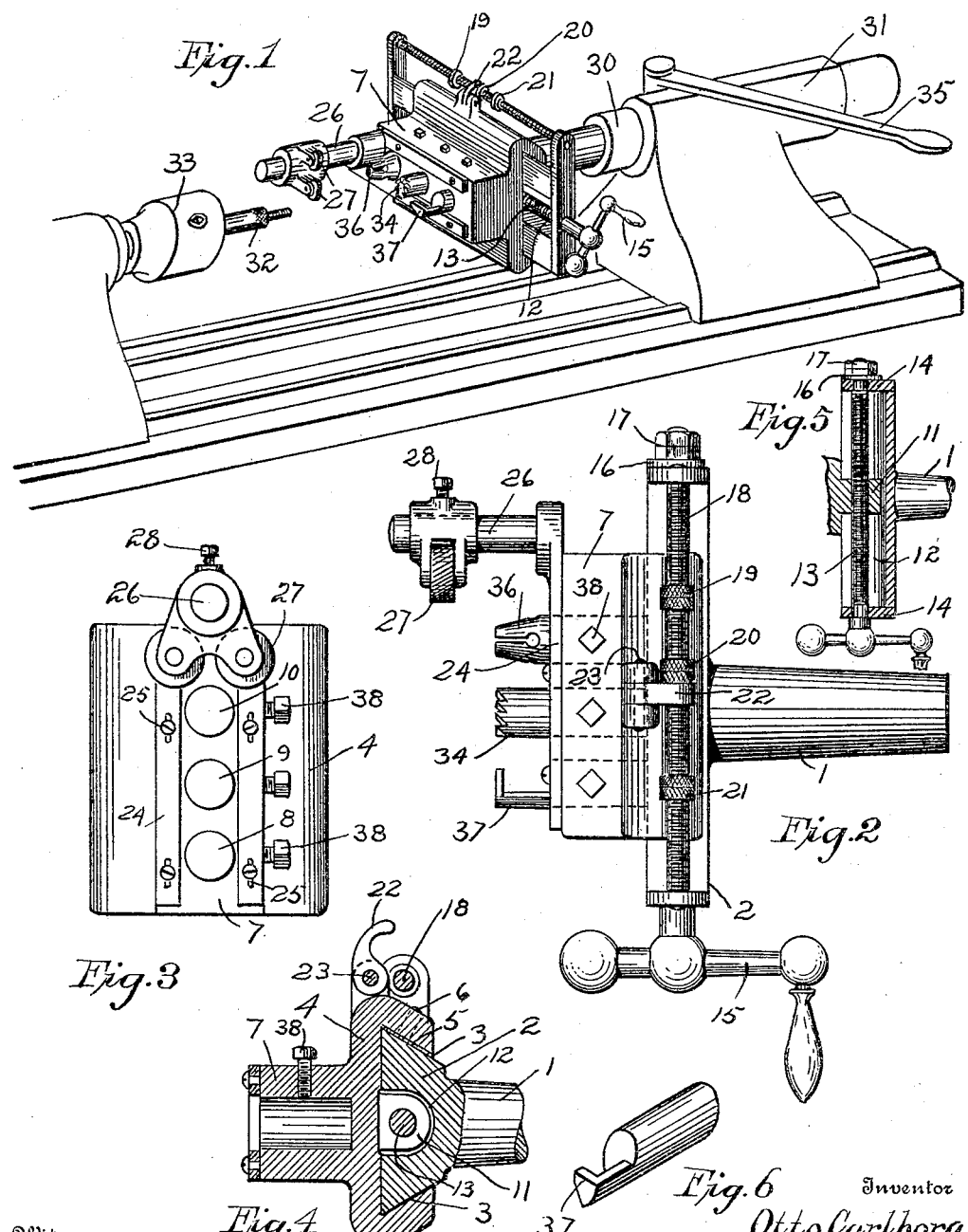
Witnesses
John F. Cavanagh
E. D. Ogden
Inventor
Otto Carlborg
By
Howard E. Barlow
Attorney

UNITED STATES PATENT OFFICE.

OTTO CARLBORG, OF PROVIDENCE, RHODE ISLAND, ASSIGNOR TO GOODSON ELECTRIC AND MANUFACTURING COMPANY, OF PROVIDENCE, RHODE ISLAND, A CORPORATION OF NEW YORK.

COMBINATION LATHE-TOOL.

940,301.  Specification of Letters Patent.  Patented Nov. 16, 1909.

Application filed February 11, 1908. Serial No. 415,290.

*To all whom it may concern:*

Be it known that I, OTTO CARLBORG, a citizen of the United States, residing at the city of Providence, in the county of Providence and State of Rhode Island, have invented certain new and useful Improvements in Combination Lathe-Tools, of which the following is a specification, reference being had therein to the accompanying drawing.

This invention relates to combination tools for lathes and the like, and has for its object to provide a simple, practical and useful implement that may be readily applied to the ordinary lathe whereby a number of different operations may be quickly performed on the work practically giving to the simple lathe the advantages commonly obtained with the turret head.

My improved implement consists essentially of the tool holder or carriage in which is mounted the several tools and which is adapted to be moved at substantially right angles to the axis of the work so as to bring said tools successively into operative position.

An essential feature of the device is that a stop is provided so that it is only necessary to move the carriage by means of the hand operated screw shaft until said stop is engaged, when by sliding forward the tail-stock spindle the tool, which is then in position, engages and performs the desired operation upon the work.

With these and other objects in view, the invention consists of certain novel features of construction, as will be more fully described and particularly pointed out in the appended claims.

In the accompanying drawings: Figure 1— is a perspective view showing my improved device as applied to an ordinary lathe, illustrating the several different kinds of tools and the manner of operating the same. Fig. 2— is an enlarged side elevation of the tool. Fig. 3— is a front view of the tool holder or carriage removed from the body portion. Fig. 4— is a central transverse section through the tool carriage and body. Fig. 5— is a central longitudinal section showing the actuating screw shaft engaging its nut. Fig. 6— is a detail showing the cutting-off tool.

Referring to the drawings, at 1 is the shank of the device which is adapted to fit into the tail-stock spindle of a lathe or into a turret head if desired, said shank being preferably permanently connected to the body portion 2 which body is set at substantially right angles to the axis of said shank. The edges 3—3 of this body portion are dove-tailed or beveled off from its front face toward its back throughout its length. The back face or portion of the tool holding carriage 4 is scored out or dove-tailed to correspond to and fit on the beveled sides of the body, the same being provided with a gib 5 adapted to be set up or adjusted by means of the screws 6 so as to take up the wear on this slide. An outwardly extending portion 7 is formed on the front face of this tool holder the same being provided with a plurality of holes 8, 9 and 10 adapted to receive tools of different shapes or character for performing different operations on the stock, and set-screws 38—38 are provided for retaining said tools in position. In order that this carriage may be moved easily by hand along its bearings on the body portion a threaded nut 11 is secured to the underside of the carriage and projects into a corresponding recess 12 in the front face of the body portion, which recess extends substantially the length of said body. An elongated screw threaded shaft 13 (see Fig. 5) passes through said nut 11 and rests in bearings 14—14 at the ends of said recess 12. To one end is attached the actuating handle 15, while the other end is held in position by means of the washer 16 and check nuts 17. A small shaft 18, preferably threaded, extends longitudinally along the outside of the body portion and adjacent the movable carriage. This shaft is preferably fixed at both ends and provided with nuts 19, 20 and 21 which may be moved along or adjusted and set in the desired position to form positive stops whereby the pawl 22, which is hinged to the carriage at 23, may be dropped down into position to engage each of said stops to indicate that its corresponding tool has been brought into position to operate upon the work.

Another feature of the invention is that a yoke 24 is fitted to the face of this carriage, the same being provided with slotted holes 25—25 whereby it may be adjusted endwise. The outer end of this yoke is provided with a longitudinally projecting pin 26 on which is mounted a pair of nurling tools 27 adapted to be moved endwise thereon and fixed in the desired position by means of the set-screw 28.

The operation of this improved tool may be more fully described as follows: This implement is particularly adapted to be set into spindle 30 of the tail-stock 31 of any ordinary lathe. The work 32 may be passed through the hollow head and held by a chuck 33, if desired, but I do not restrict myself to the application of this device to an ordinary lathe as the same may be applied to a turret lathe or any other machine in which the same may be adapted to operate. The tool, however, is particularly advantageous when applied to an engine or speed lathe, as by its use such a lathe is adapted to perform several distinct and separate operations upon the work in rapid succession, such for instance, as making screws, small spindles, and the like, in which the first operation would be to run the carriage along the body portion and across the work by means of the handle 15 until the pawl 22 brings up against the stop nuts 20, when the hollow mill 34 will be in its operating position. The tool holder is then carried forward by a movement of the lever 35 whereupon said mill 34 engages and turns down the end of the work 32 forming the shank of the screw thereon. The tool holder is then carried back by a reverse movement of the handle 35 and the carriage again moved by the cross-feed handle 15 until the pawl 22 brings up against the stop nuts 21 when the die 36 is in position to cut the thread on the shank. After this has been done the carriage is brought a little farther over until the nurling tools 27 engage and ornament the head of the screw after which the carriage is moved across to the other side and the cutting tool 37 engages and cuts off the finished screw.

Another feature of my invention is that the whole implement may be quickly removed from the lathe, laid away for any length of time and then replaced without even being obliged in any way to disturb the setting of any of the tools or any portion or member of the device.

By the use of my improved implement the scope, range of operation or efficiency of an ordinary lathe is greatly increased, as by the employment of this device an ordinary lathe is adapted to perform a great variety of work and do it in a quick and practical manner, which without the same would be impossible. Then again, this device is also adapted to increase the efficiency of the turret head as said device is supplied with a plurality of operating tools and therefore increases the number of working tools in the head.

I do not restrict myself to the number of operating tools shown in the device, as any desired number may be used therein, neither do I restrict myself to the precise construction and arrangement of parts herein shown and described, nor to the various details thereof, as the same may be modified or rearranged in various particulars without departing from the spirit and scope of my invention, one practical embodiment of which has been herein illustrated and described without attempting to show all of the various forms and modifications in which my invention might be embodied.

Having thus described my invention, what I claim as new and desire to secure by Letters Patent, is:

1. A combination lathe tool comprising a head, a carriage mounted on said head and provided with means for supporting a plurality of tools, means for adjusting said carriage on said head, a rod carried by said head, stops adjustably mounted on said rod and arranged to conform to the positions of the tools, and a pivoted tongue on said carriage arranged to engage said stops.

2. A combination lathe tool comprising a head, a carriage mounted on said head and provided with means for supporting a plurality of tools, means for adjusting said carriage on said head, arms carried by said head, a threaded rod supported by said arms, threaded stops working on said rod, and a pivoted tongue on said carriage arranged to engage said stops.

3. A combination lathe tool comprising a head, a tool supporting carriage mounted on said head and provided with means for supporting a plurality of tools, means for adjusting the carriage on said head, and a yoke mounted on the face of said carriage and adjustable with relation to said tool supporting means, said yoke being provided with means for supporting a supplemental tool.

4. A combination lathe tool comprising a head, a tool supporting carriage mounted on said head and provided with means for supporting a plurality of tools, means for adjusting the carriage on said head, and a yoke the arms of which straddle said tool holding means and adjustable with relation to the latter, said yoke being provided with means for supporting a supplemental tool.

In testimony whereof I affix my signature in presence of two witnesses.

OTTO CARLBORG.

Witnesses:
   RALPH M. STAUFFEN,
   HOWARD E. BARLOW.